(12) United States Patent  (10) Patent No.: US 9,940,387 B2
Holt et al.  (45) Date of Patent: Apr. 10, 2018

(54) SEARCH QUERY GENERATION USING QUERY SEGMENTS AND SEMANTIC SUGGESTIONS

(71) Applicant: LexisNexis, a division of Reed Elsevier Inc., Miamisburg, OH (US)

(72) Inventors: Michael Edward Holt, Miamisburg, OH (US); Craig Woollard, Southend-on-Sea (GB)

(73) Assignee: LEXISNEXIS, A DIVISION OF REED ELSEVIER INC., Miamisburg, OH (US)

( * ) Notice: Subject to any disclaimer, the term of this patent is extended or adjusted under 35 U.S.C. 154(b) by 458 days.

(21) Appl. No.: 14/166,108

(22) Filed: Jan. 28, 2014

(65) Prior Publication Data

US 2014/0195519 A1    Jul. 10, 2014

Related U.S. Application Data

(63) Continuation of application No. PCT/US2011/045647, filed on Jul. 28, 2011.

(51) Int. Cl.
*G06F 17/30* (2006.01)
(52) U.S. Cl.
CPC ................ *G06F 17/3064* (2013.01)
(58) Field of Classification Search
None
See application file for complete search history.

(56) References Cited

U.S. PATENT DOCUMENTS

| 6,564,213 | B1 |   | 5/2003 | Ortega et al. |
| 7,249,121 | B1 | * | 7/2007 | Bharat ............... G06F 17/30663 |
| 8,249,885 | B2 | * | 8/2012 | Berkowitz ......... G06F 17/30873 |
|   |   |   |   | 705/1.1 |
| 8,868,591 | B1 | * | 10/2014 | Finkelstein ......... G06F 17/3064 |
|   |   |   |   | 707/767 |

(Continued)

FOREIGN PATENT DOCUMENTS

GB    2365150    2/2002

OTHER PUBLICATIONS

International Search Report and Written Opinion of PCT/US2011/045647 filed Jul. 28, 2011, dated Jun. 18, 2012.

(Continued)

*Primary Examiner* — Charles Adams
(74) *Attorney, Agent, or Firm* — Dinsmore & Shohl LLP

(57) ABSTRACT

Methods and computer program products for generating a search query are provided. A method includes receiving a first string of characters inputted into a text input field of a graphical user interface, wherein the first string of characters represents a first portion of the search query. One or more query suggestions based on the first string of characters are displayed within the graphical user interface. The method further includes receiving a selected first query suggestion and displaying it in a first query segment within the text input field. A second string of characters inputted into the text input field of the graphical user interface may also be received. One or more second query suggestions based on the second string of characters may be displayed. A selected second query suggestion may be received from the one or more second query suggestions and then displayed in a second query segment.

16 Claims, 11 Drawing Sheets

(56) References Cited

U.S. PATENT DOCUMENTS

| | | | |
|---|---|---|---|
| 2003/0103034 A1* | 6/2003 | Silverbrook | B41J 2/17503 |
| | | | 345/156 |
| 2005/0043939 A1 | 2/2005 | Trower, II et al. | |
| 2006/0235843 A1* | 10/2006 | Musgrove | G06F 17/30616 |
| 2007/0094256 A1* | 4/2007 | Hite | G06F 17/2785 |
| 2009/0006543 A1 | 1/2009 | Smit | |
| 2009/0144234 A1 | 6/2009 | Sharif et al. | |
| 2011/0125724 A1* | 5/2011 | Mo | G06F 17/30867 |
| | | | 707/706 |
| 2012/0246165 A1* | 9/2012 | Batraski | G06F 17/30867 |
| | | | 707/740 |
| 2012/0297294 A1* | 11/2012 | Scott | G06F 17/273 |
| | | | 715/261 |

OTHER PUBLICATIONS

Sengstock et al., "Conquer: A System for Efficient Context-aware Query Suggstions," Mar. 28-Apr. 1, 2011, Hyderabad, India.
Bast et al., "Output-Sensitive Autocompletion Search," MPI-I-2006-1-007, Jun. 2006.

* cited by examiner

SEARCH QUERY GENERATION USING QUERY SEGMENTS AND SEMANTIC SUGGESTIONS

BACKGROUND

Field

The present specification generally relates to generating search queries and, more particularly, methods and computer program products for generating search queries using query segments resulting from query suggestions and/or semantic suggestions.

Technical Background

Many search tools, such as search engines, use a text input field into which a user may enter a search query to search for relevant data, such as documents, web-pages, and other data. Auto-complete functionality may be employed wherein several suggestions are presented to the user while he or she types characters into the text input field. The suggestions may change as the user continues to enter more characters, and are based on all of the characters that have been entered into the text input field.

However, in some contexts such as legal research, it may be desirable to formulate a search query that comprises two or more related but distinct concepts. Existing auto-complete techniques may be undesirable because the suggestions are based on all of the characters entered into the text input field. For example, a user may enter a string of characters relating to a first concept and then enter a string of characters relating to a second concept. Existing auto-complete techniques may attempt to provide suggestions based on both the first concept and the second concept combined, which may be ineffective.

Accordingly, a need exists for alternative methods and computer program products for generating search queries directed to multiple and distinct concepts.

SUMMARY

In one embodiment, a method in a computer system for generating a search query includes receiving a first string of characters inputted into a text input field of a graphical user interface, wherein the first string of characters represents a first portion of the search query. One or more query suggestions based at least in part on the first string of characters are displayed within the graphical user interface. The method further includes receiving a selected first query suggestion from the one or more first query suggestions, and displaying the selected first query suggestion in a first query segment within the text input field. A second string of characters inputted into the text input field of the graphical user interface may also be received, wherein the second string of characters represents a second portion of the search query. One or more second query suggestions based at least in part on the second string of characters may be displayed within the graphical user interface, and a selected second query suggestion may be received from the one or more second query suggestions and then displayed in a second query segment that is distinct from the first query segment within the text input field. The first query segment and the second query segment define the search query.

In another embodiment, a method in a computer system for generating a search query includes receiving a search query including a first query segment and a second query segment from a single text input field, wherein the first query segment is distinct from the second query segment. The method further includes generating one or more first semantic suggestions based at least in part on the first query segment and one or more second semantic suggestions based at least in part on the second query segment. The one or more first semantic suggestions are semantically similar to the first query segment, and the one or more second semantic suggestions are semantically similar to the second query segment. The one or more first semantic suggestions and the one or more second semantic suggestions may be displayed within a graphical user interface.

In yet another embodiment, a computer program product for use with a graphics display device includes a computer usable medium having computer readable program code embodied on the computer usable medium for generating a search query. The computer readable program code includes computer readable code instructions configured to cause a computer to receive a first string of characters and a second string of characters inputted into a text input field of a graphical user interface displayed on the graphics display device, wherein the first string of characters representing a first portion of the search query and the second string of characters representing a second portion of the search query. The computer readable program code further includes computer readable code instructions configured to display on the graphics display device one or more first query suggestions based at least in part on the first string of characters and one or more second query suggestions based at least in part on the second string of characters, and computer readable code instructions configured to receive a selected first query suggestion from the one or more first query suggestions and a selected second query suggestion from the one or more second query suggestions. The computer readable program code further includes computer readable code instructions configured to display on the graphics display device the selected first query suggestion in a first query segment within the text input field and the selected second query suggestion in a second query segment that is distinct from the first query segment within the text input field, wherein the first query segment and the second query segment define the search query.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, wherein like structure is indicated with like reference numerals and in which:

DETAILED DESCRIPTION

Referring generally to the figures, embodiments described herein are directed to methods and computer program products for building a query to search for documents. More specifically, the embodiments described herein may enable auto-complete suggestions for individual, discrete query segments of a search query entered into a text input field of a graphical user interface. Rather than providing auto-complete suggestions for an entire string of text entered into a text input field, embodiments described herein may provide suggestions for each discrete concept of a search query. As an example and not a limitation, a user may desire to search for legal documents relating to the legal concepts of "felony murder" and "proximate cause." The user may type "murder" or "felony" into the text input field and be presented with query suggestions that include, inter alfa, "felony murder." The user may select the "felony murder" query suggestion as the first query segment of his or her search query, and then start typing "proxim," where new query suggestions may be presented, such as "proximate cause." The user may then select the "proximate cause" query suggestion as the second query segment of his or her search query. In this manner, multiple auto-complete sessions may be provided in a single text input field, which may provide for the generation of more effective search queries.

Embodiments described herein may also provide semantic suggestions based on the query segments selected by the user. Generally, the query segments may be compared with a thesaurus (in conjunction or individually) to generate semantic suggestions that are semantically similar to the original query segments. The user may then decide to select one or more of the semantic suggestions to enhance his or her search query. The semantic suggestions may come in the form of broader query terms, narrower query terms, and similar query terms. Various embodiments of methods, user interfaces, and computer program products for generating a search query using multiple auto-complete sessions within a text input field and/or providing semantic suggestions based on distinct query segments are described in detail below.

Although embodiments described herein are described in the context of electronic legal research applications, embodiments are not limited thereto. For example, the embodiments described herein may be incorporated into web-browsers to search the internet, technical paper search tools to search a corpus of technical papers, or any application for which a user inputs a search query to return a set of documents or data.

Figure 1:
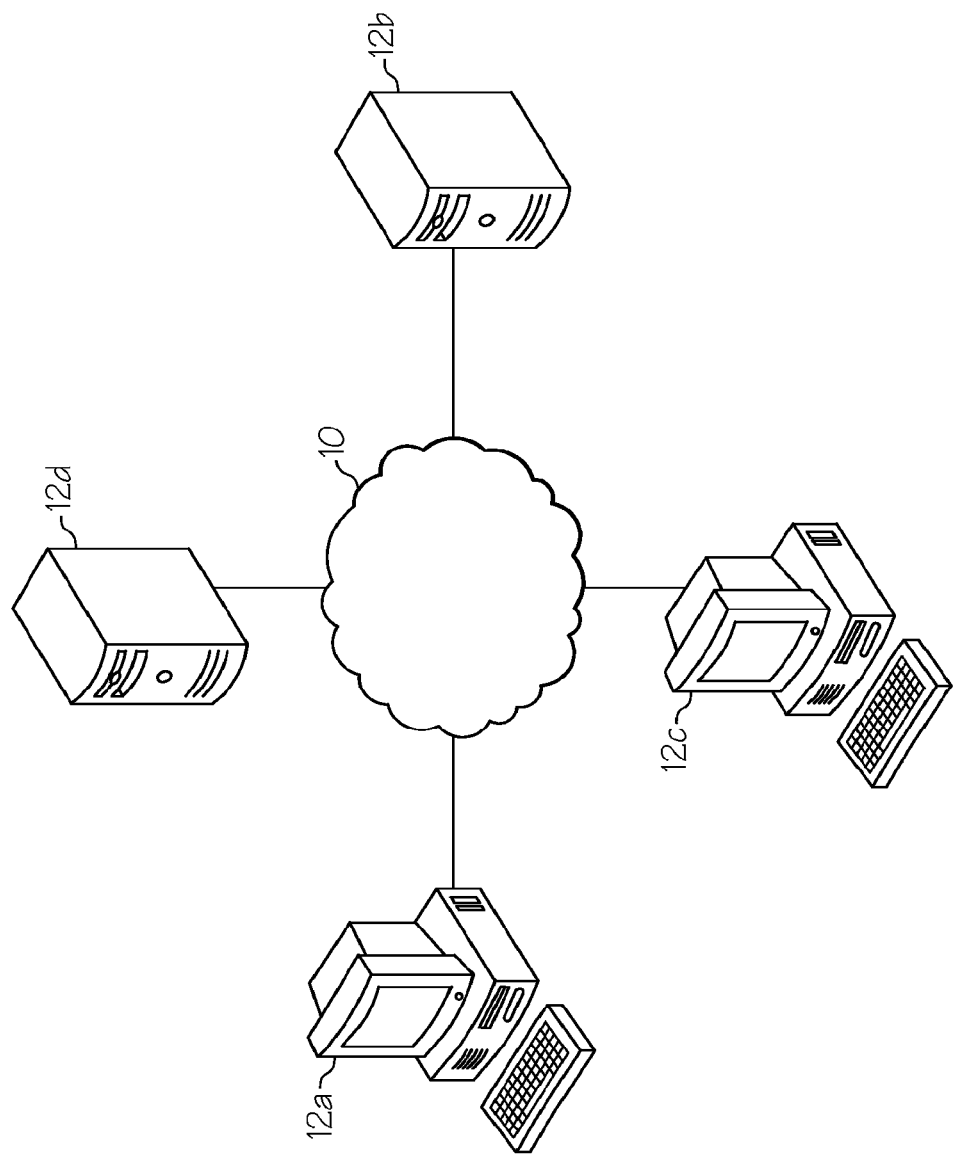
FIG. 1 depicts a schematic illustration of a computer system for generating a search query according to one or more embodiments described and illustrated herein.

Referring now to the drawings, FIG. 1 depicts an exemplary computing network, illustrating components for a system for generating search queries that may be used to search a document corpus, according to embodiments shown and described herein. As illustrated in FIG. 1, a computer network 10 may include a wide area network, such as the internet, a local area network (LAN), a mobile communications network, a public service telephone network (PSTN) and/or other network and may be configured to electronically connect a user computing device 12a, a server computing device 12b, an administrator computing device 12c, and a semantic suggestion server 12d. It should be understood that the non-limiting system illustrated in FIG. 1 is provided for illustrative purposes only, and that other configurations are also possible. Further, in some embodiments, the methods may be performed not on a system or network, but locally within a single computing device, such as a personal computer, smart phone, and the like. For example, the embodiments described herein may be incorporated into an operating system running on a computing device to search for documents stored locally on the computing device.

In the exemplary computing network, the user computing device 12a may be used to input one or more documents into an electronic document corpus as well as perform searching of the document corpus. The user computing device 12a may also be utilized to perform other user functions. Additionally, included in FIG. 1 is the administrator computing device 12c. In the event that the server computing device 12b requires oversight, updating, or correction, the administrator computing device 12c may be configured to provide the desired oversight, updating, and/or correction. The administrator computing device 12c, as well as any other computing device coupled to the computer network 10, may be used to input one or more documents into the electronic document corpus.

The user computing device 12a and the administrator computing device 12c may be capable of displaying the graphical user interfaces described hereinbelow, such that users may enter search queries (including search query segments) that may be used to search a document corpus stored in a document database associated with the server computing device 12b, or other databases coupled to the computer network 10.

In one embodiment, the system further includes a semantic suggestion server 12d that is coupled to the computer network 10. The semantic suggestion server 12d may be configured as a server that receives search queries from the user computing device 12a and/or the server computing device 12b, generates semantic suggestions based on the search queries using semantic suggestion logic and data, and provides semantic suggestions back to the server computing device 12b and/or the user computing device 12a. In another embodiment, the semantic suggestion functionality may be provided not only on a separate semantic server but on the server computing device 12b, the user computing device 12a, and/or the administrator computing device 12c.

It should be understood that while the user computing device 12a and the administrator computing device 12c are depicted as personal computers and the server computing device 12b and the semantic suggestion server 12d are depicted as a server, these are nonlimiting examples. More specifically, in some embodiments any type of computing device (e.g., mobile computing device (smart phone, tablet computer, laptop computer, etc.), personal computer, server, etc.) may be utilized for any of these components. Additionally, while each of these computing devices are illustrated in FIG. 1 as a single piece of hardware, this is also merely an example. More specifically, each of the user computing device 12a, server computing device 12b, administrator computing device 12c, and semantic suggestion server 12*d* may represent a plurality of computers, servers, databases, mass-storage devices, etc.

Figure 2:
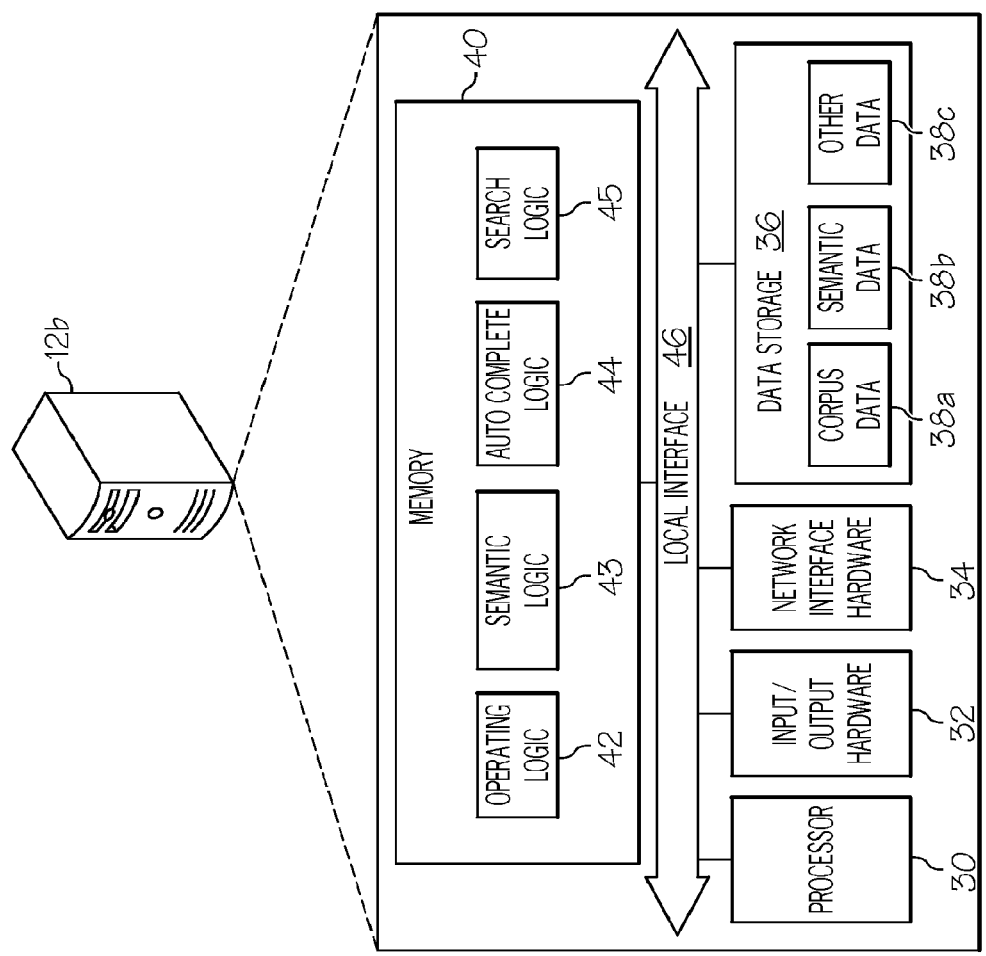
FIG. 2 depicts a schematic illustration of the server computing device from FIG. 1, further illustrating hardware and software that may be utilized in performing the search query generation functionality according to one or more embodiments described and illustrated herein.

FIG. 2 depicts the server computing device 12*b* depicted in FIG. 1, further illustrating a system for generating a search query, and/or a non-transitory computer usable medium having computer readable program code for generating a search query embodied as hardware, software, and/or firmware, according to embodiments shown and described herein. While in some embodiments, the server computing device 12*b* may be configured as a general purpose computer with the requisite hardware, software, and/or firmware, in some embodiments, that server computing device 12*b* may be configured as a special purpose computer designed specifically for performing the functionality described herein. It should be understood that the software, hardware, and/or firmware components depicted in FIG. 2 may also be provided in the user computing device 12*a* and/or the administrator computing device 12*c* depending, on the particular application.

As also illustrated in FIG. 2, the server computing device 12*b* (or user computing device 12*a*, or administrator computing device 12*c*) may include a processor 30, input/output hardware 32, network interface hardware 34, a data storage component 36 (which may store corpus data 38*a* (e.g., searchable legal documents), semantic suggestion data 38*b*, and other data 38*c*), and a non-transitory memory component 40. The memory component 40 may be configured as volatile and/or nonvolatile computer readable medium and, as such, may include random access memory (including SRAM, DRAM, and/or other types of random access memory), flash memory, registers, compact discs (CD), digital versatile discs (DVD), and/or other types of storage components. Additionally, the memory component 40 may be configured to store operating logic 42, semantic logic 43, auto-complete logic 44, and search logic 45 (each of which may be embodied as computer readable program code, firmware, or hardware, as an example). A local interface 46 is also included in FIG. 2 and may be implemented as a bus or other interface to facilitate communication among the components of the server computing device 12*b*.

The processor 30 may include any processing component configured to receive and execute computer readable code instructions (such as from the data storage component 36 and/or memory component 40). The input/output hardware 32 may include a graphics display device, keyboard, mouse, printer, camera, microphone, speaker, touch-screen, and/or other device for receiving, sending, and/or presenting data. The network interface hardware 34 may include any wired or wireless networking hardware, such as a modem, LAN port, wireless fidelity (Wi-Fi) card, WiMax card, mobile communications hardware, and/or other hardware for communicating with other networks and/or devices.

It should be understood that the data storage component 36 may reside local to and/or remote from the server computing device 12*b*, and may be configured to store one or more pieces of data for access by the server computing device 12*b* and/or other components. As illustrated in FIG. 2, the data storage component 36 may store corpus data 38*a*, which in at least one embodiment includes legal documents and/or other documents that have been organized and indexed for searching. The legal documents may include legal opinions, legal briefs, patent documents, etc. The corpus data 38*a* may be stored in one or more data storage devices. Similarly, semantic suggestion data 38*b* may be stored by the data storage component 36 and may include information relating to the generation of semantic suggestions. In another embodiment, the server computing device 12*b* may be coupled to a remote server or data storage device (e.g., semantic suggestion server 12*d*) that comprises semantic data (e.g., thesaurus data) such that the semantic suggestions are generated remotely from the server computing device 12*b*. Other data 38*c* may be stored in the data storage component 36 to provide support for functionalities described herein (e.g., metadata that may be utilized in conjunction with the corpus data 38*a* to index the electronic documents stored within the document corpus).

Included in the memory component 40 may be the operating logic 42, the semantic logic 43, auto-complete logic 44, and the search logic 45. The operating logic 42 may include an operating system and/or other software for managing components of the server computing device 12*b*. The operating logic may also include computer readable program code for displaying the graphical user interface. Similarly, the semantic logic 43 may reside in the memory component 40 and may be configured to facilitate electronic generation of the semantic suggestions in response to query segments provided in a search query. The search logic 45 may be configured to generate search queries from user-input within the graphical user interface, as described in detail below.

It should be understood that the components illustrated in FIG. 2 are merely exemplary and are not intended to limit the scope of this disclosure. More specifically, while the components in FIG. 2 are illustrated as residing within the server computing device 12*b*, this is a nonlimiting example. In some embodiments, one or more of the components may reside external to the server computing device 12*b*. Similarly, while FIG. 2 is directed to the server computing device 12*b*, other components such as the user computing device 12*a* and the administrator computing device 12*c* may include similar hardware, software, and/or firmware.

Figure 3:
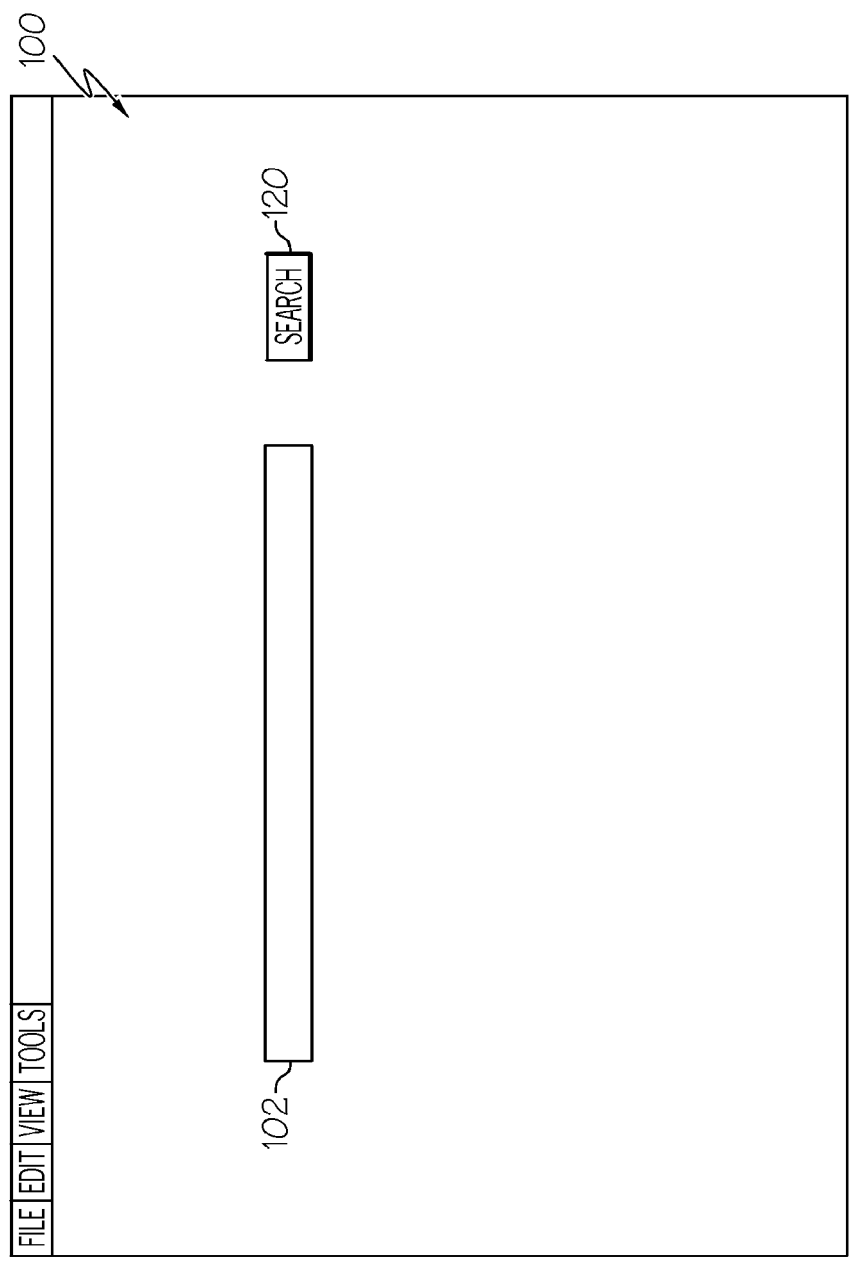
FIG. 3 depicts a text input field of a graphical user interface according to one or more embodiments described and illustrated herein.

FIG. 3 depicts an exemplary graphical user interface 100 displayed within a web-browser. The graphical user interface 100 comprises a text input field 102 and a search button 120 to initiate a search based on the search query provided in the text input field. The text input field 102 may be an element of any type of graphical user interface provided on a graphics display device of a computing device. For example, the graphical user interface may be configured as a webpage that is displayed by a web-browser, as depicted in FIG. 3. In another embodiment, the text input field is displayed within a graphical user interface that is displayed by a mobile computing application (e.g., on a smart phone). Other implementations of the graphical user interface are also possible. It should be understood that embodiments are not limited to the graphical user interface 100 illustrated throughout the figures, and that other configurations are possible. For example, the graphical user interface 100 may provide user-selectable searching options for other features.

Figure 4:
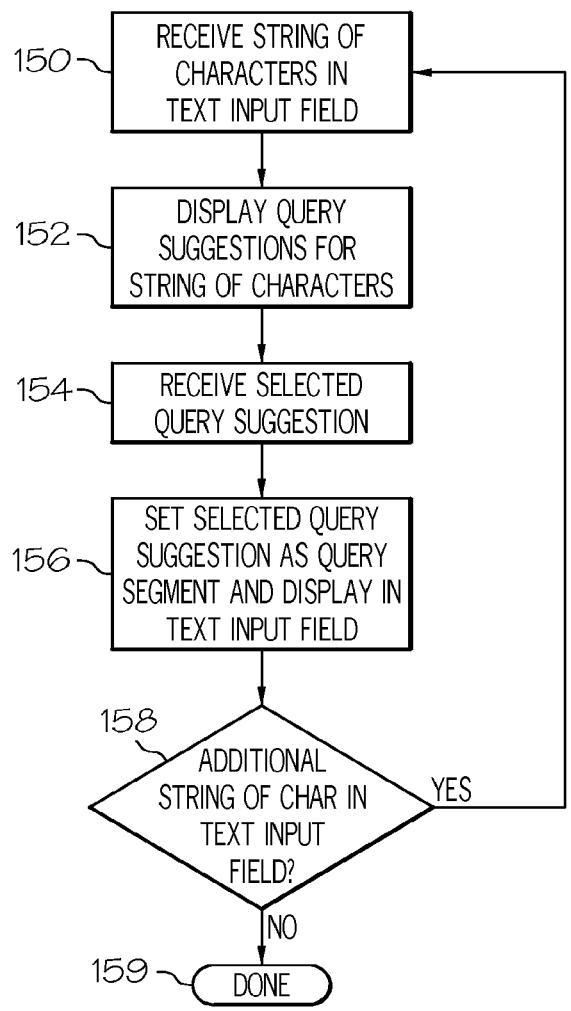
FIG. 4 depicts a flowchart of a process for generating a search query using multiple auto-complete sessions in a text input field according to one or more embodiments described and illustrated herein.

Referring now to FIG. 4A, a flowchart that graphically illustrates a method of generating a search query using multiple auto-complete sessions within a single text input field is provided. It is noted that the flowcharts of FIGS. 4 and 12 will be described in conjunction with the corresponding graphical user interfaces of FIGS. 5-11, and 13-15. At block 150, a string of characters representing a portion of a search query (e.g., a first portion) may be entered into a text input field and received by server computing device 12*b* or other computing device that will process the received string of characters. At block 152, one or more query suggestions (e.g., first query suggestions corresponding to a first portion of the search query, second query suggestions corresponding to a second portion of the search query, etc.) within the graphical user interface may be displayed to the user. The query suggestions are based on the string of characters that define the particular portion of the search query. The query suggestions described herein may be referred to as auto-complete suggestions, wherein the query suggestions are predictions of the word or phrase that the user desires to enter into the text input field 102. Any known or yet-to-be-developed auto-complete methods may be used to provide the query suggestions. In one embodiment, the server computing device 12b receives the string of characters, determines the query suggestions, and provides the query suggestions for display within the graphical user interface. In another embodiment, the query suggestions are received and determined locally by the computing device displaying the graphical user interface.

Figure 5:
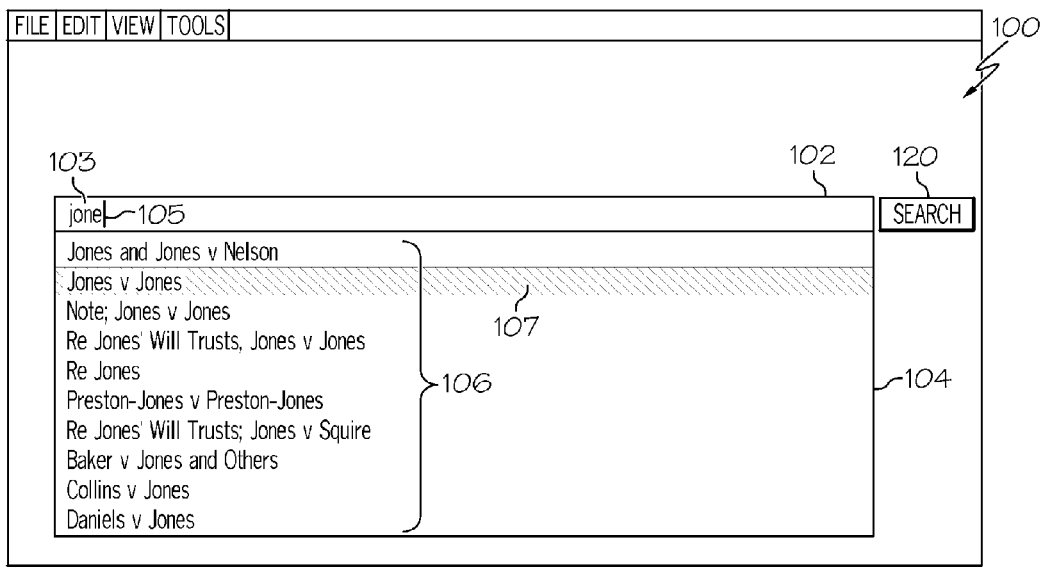
FIGS. 5-11 depict search query formulation functionality of the graphical user interface illustrated in FIG. 3, according to one or more embodiments described and illustrated herein.

FIG. 5 illustrates a string of characters 103 "jone" being entered into the text input field 102 of the graphical user interface 100. As the user types the string of characters 103, a query suggestion box 104 may appear below the text input field 102. The query suggestion box 104 displays several query suggestions 106 for the user to select. The query suggestions 106 may have similar words or phrases as the string of characters 103 entered into the text input field. The query suggestions 106 may appear and change dynamically as the user types the string of characters 103. Embodiments are not limited to the format of the query suggestion box 104 illustrated in FIG. 5. For example, in some embodiments the query suggestions 106 may not be displayed in a box. Additionally, the query suggestion box 104 may appear within the graphical user interface 100 at a location other than below the text input field 102.

In one embodiment, the graphical user interface 100 may allow a user to set filters on the type of query suggestions 106 that are displayed within the query suggestion box 104. In the illustrated example, only court case names are provided as query suggestions 106. Other filters may be used, such as filters for legal phrases and concepts, people names, geographic locations, etc.

Figure 6:
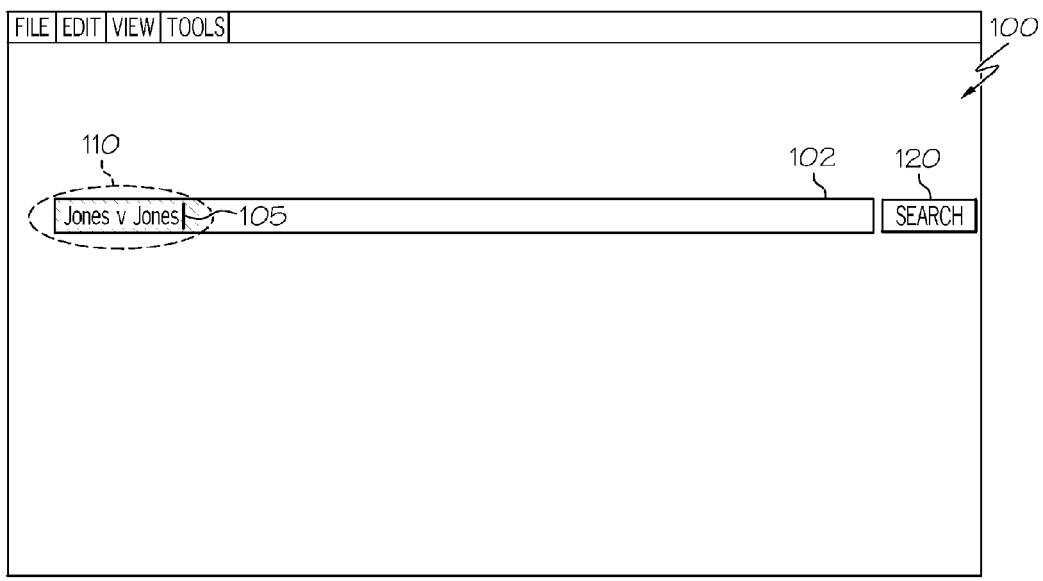

The query suggestions 106 may be selectable by a user to set a selected query suggestion as a query segment of the search query. As shown in FIG. 5, a user may select a query suggestion (e.g., selected query suggestion 107 "Jones v Jones") using a mouse or other input device/method. Referring again to FIG. 4, the selected query suggestion is received at block 154 (e.g., by the computing device displaying the graphical user interface) and is set as a query segment of the search query at block 156. The query segment is then displayed within the text input field 102. FIG. 6 depicts a first query segment 110 as the selected query suggestion "Jones v Jones." When the user does not select a query suggestion, the string of characters representing the query portion may become the query segment. The first query segment 110 illustrated in FIG. 6 is a distinct phrase of the search query that resulted from an individual auto-complete session. After the user selects the selected query suggestion, the text cursor 105 within the text input field 102 may be positioned after the first query segment 110 such that the user may enter a string of characters representing a second portion of the search query.

In some embodiments, the query selections may have a background color associated therewith. For example, the first query segment 110 may have a background color that is different from the color of the background of the text input field 102. The query segment background color may be turned on or off by the user in some embodiments. Further, the user may customize the background color of each query segment (e.g., each query segment being of the same color, or each being of a different color, etc.). In yet other embodiments, the font of each query segment may be of a different color or style.

Figure 7:
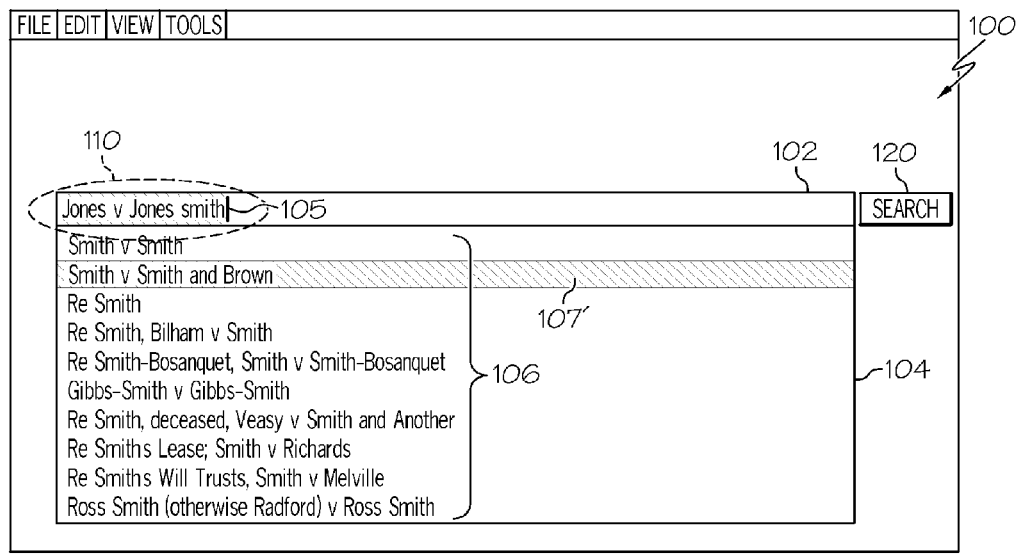
Figure 8:
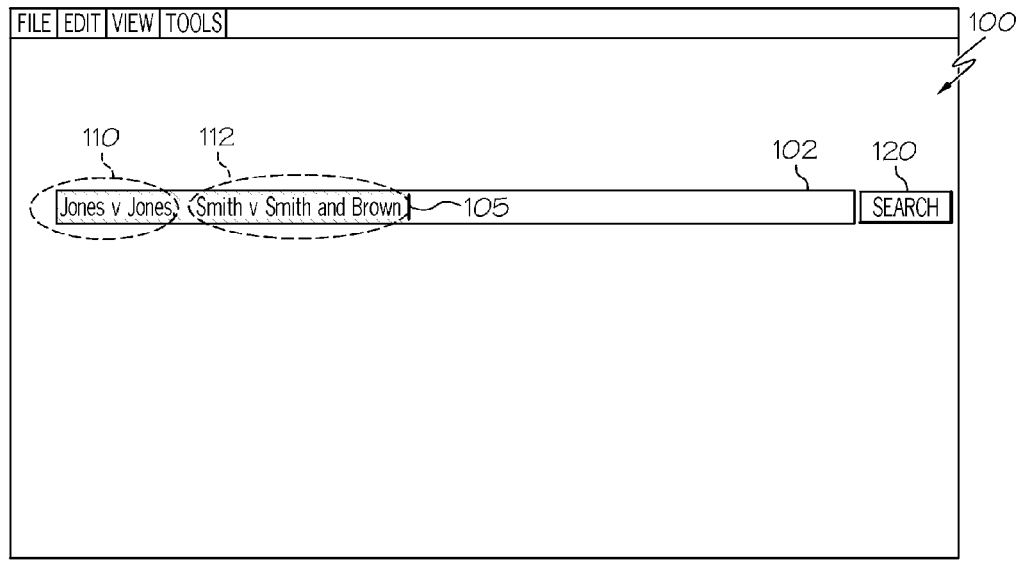
Figure 9:
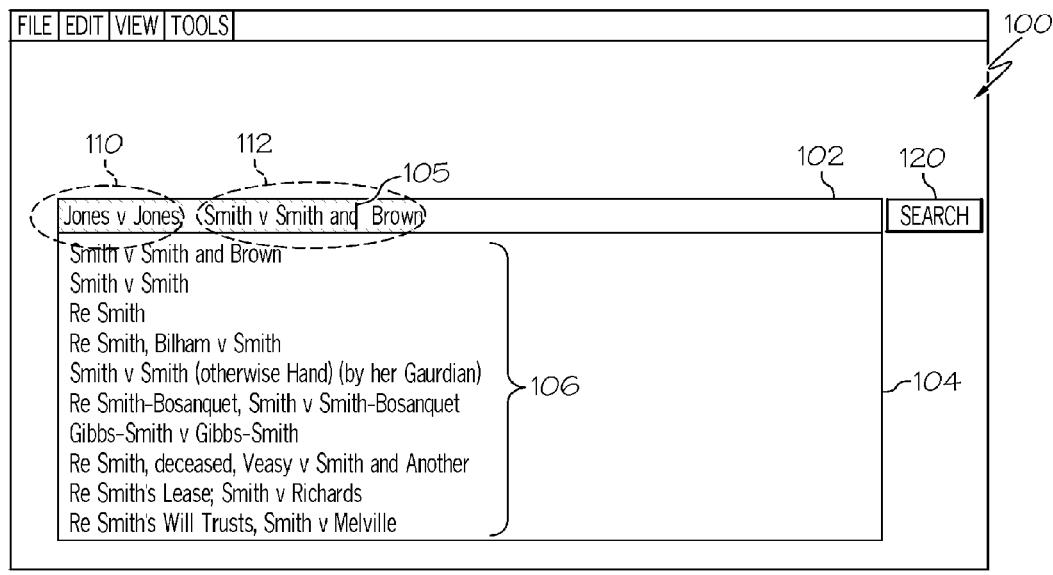

Referring once again to FIG. 4, at block 158 it is determined whether or not there is an additional string of characters entered into the text input field. If yes, block 150 through block 156 may be repeated to include any number of additional query segments based on additional query suggestions. If there is not an additional string of characters, then the process may end at block 159. FIG. 7 depicts that a user has entered the word "smith" next to the first query segment 110 such that the query suggestion box 104 displays query suggestions 106 based on the word "smith." The query suggestion "Smith v Smith and Brown" is shown as the selected query suggestion 107' such that it becomes the second query segment 112 of the search query within the text input field 102 shown in FIG. 8. Now the search query comprises a first query segment 110 "Jones v Jones" and a second query segment 112 "Smith v Smith and Brown" entered into a single text input field and resulting from two auto-complete sessions. The user may click or otherwise select the search button 120 to search a document corpus when he or she is satisfied with the search query.

The multiple auto-complete sessions may provide the benefit of displaying normalized query suggestions that exactly match phrases or words that appear within the documents of the document corpus. In the court case name example, the suggested court names may have the exact spelling of the case names that appear in the document corpus. Additionally, normalization of the terms, phrases, court case names, etc. may increase the accuracy of the search query.

An existing query segment may be revised by positioning the text cursor 105 within the query segment and typing additional characters. In the example illustrated in FIG. 9, the user has positioned the text cursor 105 between "Smith" and "Brown" of the second query segment 112 and has typed the word "and." The query suggestion box 104 appears and provides updated query suggestions 106. Additionally, the query suggestions may be provided based on the position of the cursor within the query segment without the addition of new text. For example, the query suggestions may be based on the characters that precede the text cursor 105.

In one embodiment, reserved words may be used to enter connectors between query segments, as well as to split a query segment into two or more split query segments. Reserved words such as uppercase "AND" and "OR" may be automatically recognized and used as Boolean operators accordingly. Other operators may be used, such as W/P for the "within paragraph" operator, for example. Any type of operator may be detected and used. Additionally, reserved words are not limited to uppercase words as other formats may be used to indicate that the type of word is intended as a reserved word.

Figure 10:
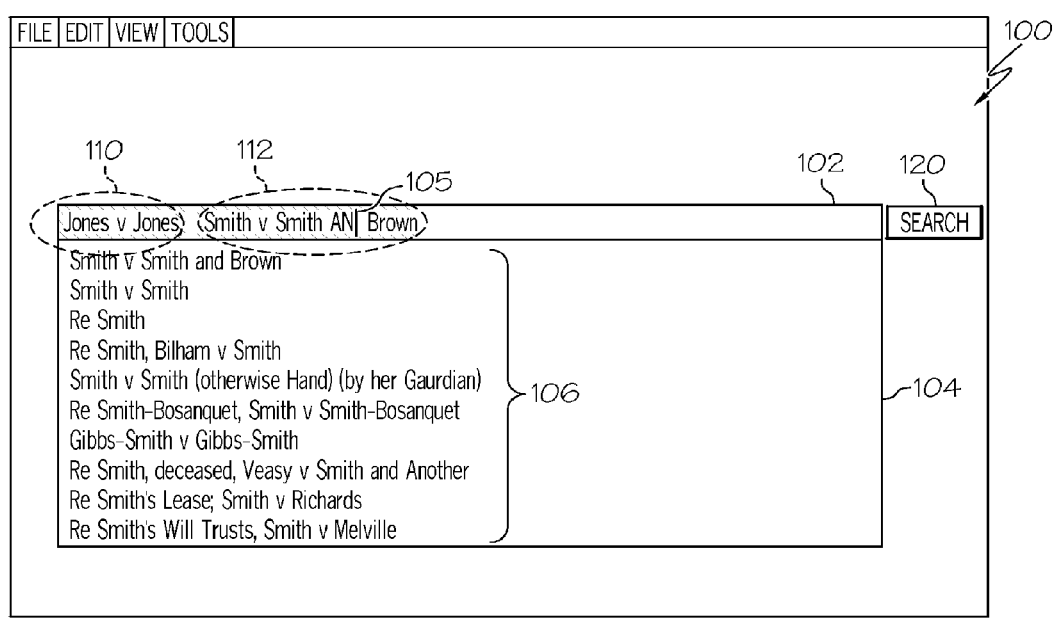
Figure 11:
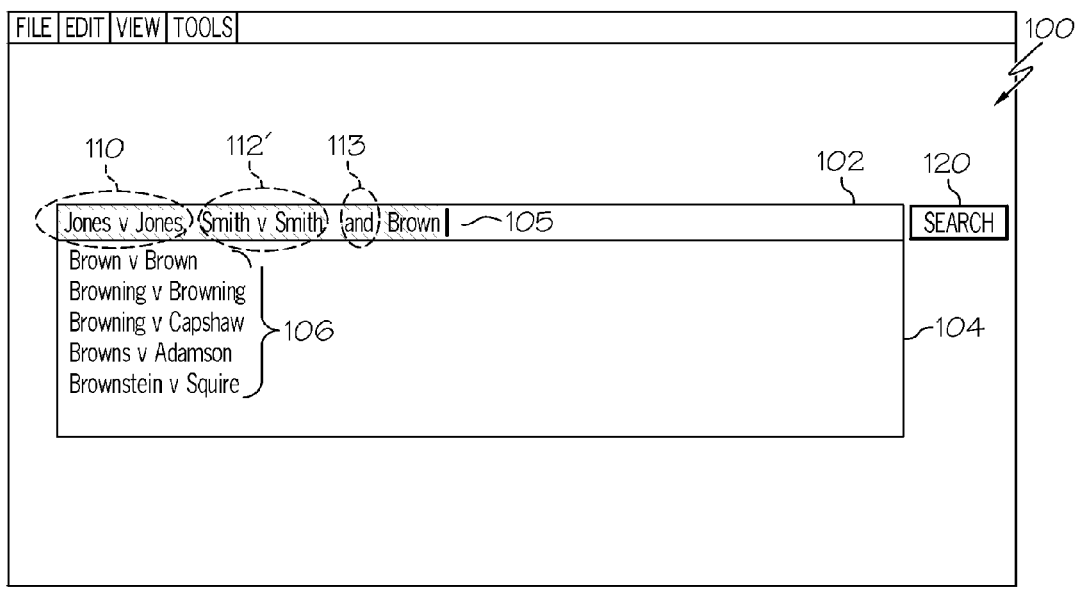

Reserved words may be entered directly into a query segment to split the query segment into two. FIGS. 10 and 11 depict that a user has typed the uppercase word "AND" as a reserved word 113 to split the second query segment 112 into a revised second query segment 112' and a third query segment that may result from the word "Brown" that appears to the right of the reserved word 113. It is noted that the revised second query segment 112' may not be treated as an auto-complete query suggestion but rather as the free-text query segment "Smith v Smith and." The user may make the revised second query segment 112' an auto-complete query suggestion by placing the cursor into the revised query segment 112', optionally typing text, and selecting of the displayed query suggestions.

Once the user is satisfied with his or her search query, he or she may initiate a search of the document corpus to return and display a set of retrieved documents.

A text input field 102 allowing multiple auto-complete sessions may be implemented in a variety of ways. In one embodiment, HTML mark up may be used to mimic a typical input field to allow for further HTML element to be embedded within the text input field 102. The text input field 102 may be achieved using a DIV element with an attribute of content editable enabled along with CCS styling to feign a traditional input field. Query segments may then be nested within the text input field 102 and encapsulated using span elements. These span elements may keep metadata about each query segment including the type (e.g., query term or operator) and a unique identifier for each query segment to allow for granular referencing. Client-side scripting (e.g., JavaScript) on the computing device displaying the graphical user interface may manage the creation and destruction of the query segment mark-up based on the user's interaction (e.g., user-indicated delimitation via auto-complete selection or provision of operators, deletion of an entire string encapsulated by a query segment span, etc.).

In one embodiment, one or more semantic suggestions may be provided one or more of the query segments after a user searches the document corpus, or upon a request for search term enhancement. The semantic suggestions may be provided to the user within the graphical user interface 100 for selection. Generally, the semantic suggestions are words or phrases that are semantically similar to the query segments, either individually or in conjunction with one another. The semantic suggestions may be broader, narrower, or similar in scope to the original query segments.

Figure 12:
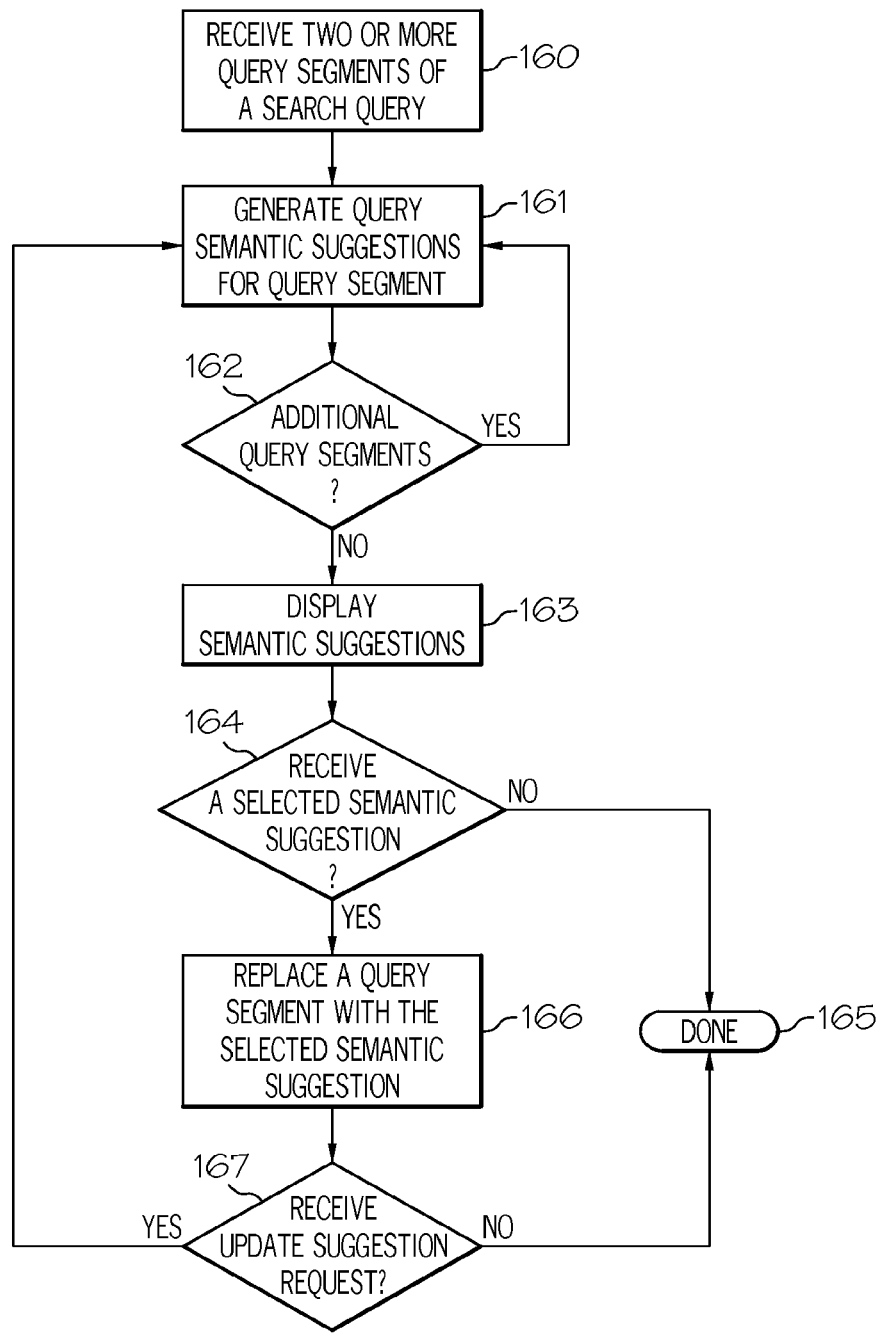
FIG. 12 depicts a flowchart of a process for generating a search query using semantic suggestions according to one or more embodiments described and illustrated herein.

FIG. 12 is a flowchart illustrating an exemplary method of providing semantic suggestions based on query segments of a search query. At block 160, two or more query segments of a search query are received by the computing device that will generate the semantic suggestions. For example, the computing device that receives the query segments may be the semantic suggestion server 12*d* illustrated in FIG. 1, a semantic database containing semantic data (e.g., thesaurus data), the local computing device displaying the graphical user interface 100, etc.

At block 161, semantic suggestions for one or more of the received query segments are generated. If it is determined that there are additional query segments to process at block 162, then block 161 repeats so that each of the query segments in the search query are processed. In one embodiment, each query segment is compared with thesaurus data individual to return a set of semantic suggestions that are semantically similar to the corresponding query segment. In another embodiment, the query segments are compared with the thesaurus together, such that each query segment has an influence on the query suggestions for not only its returned semantic suggestions, but also for the semantic suggestions returned for the other query segments in the search query. For example, a change to a first query segment may affect second semantic suggestions for a second query segment within the search query.

Figure 13:
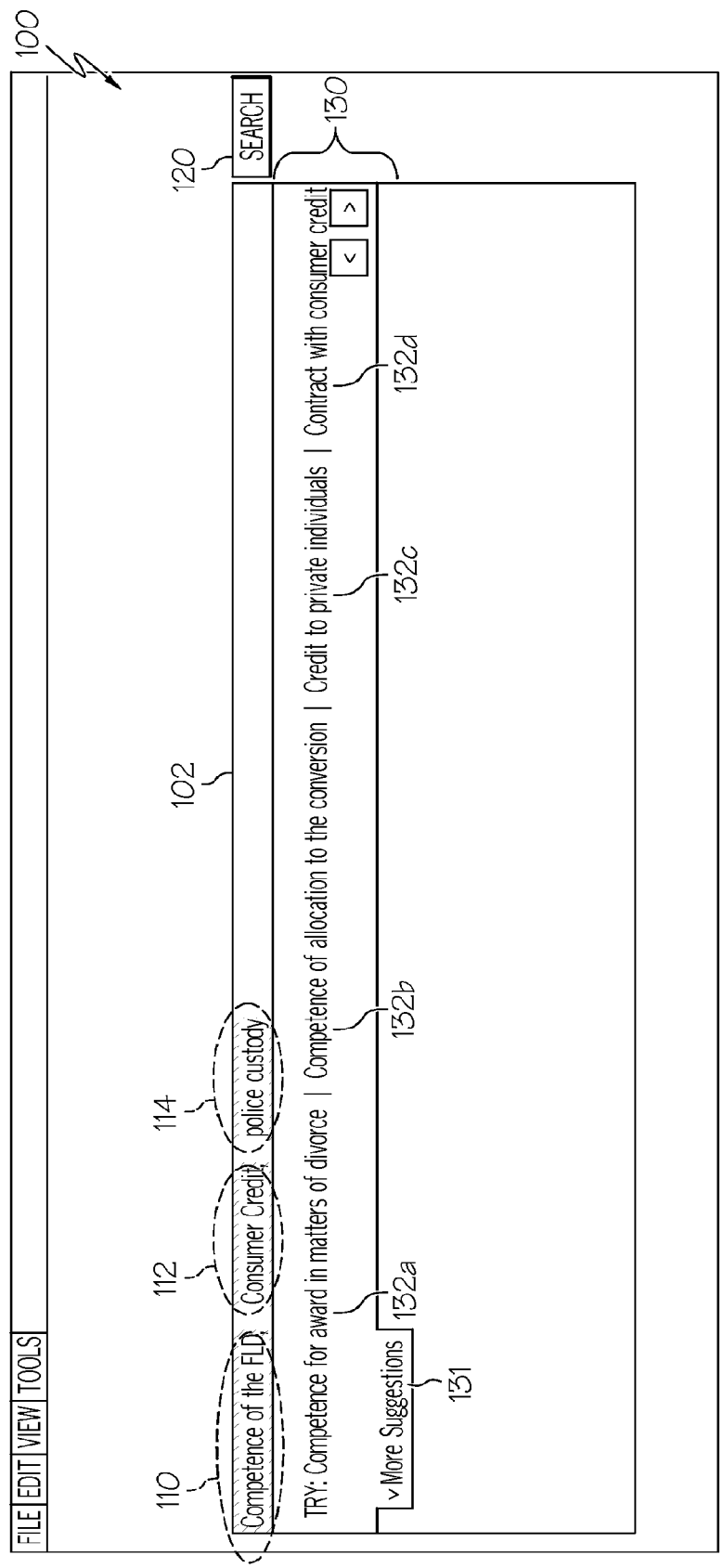
FIGS. 13-14 depict semantic suggestion functionality of a graphical user interface according to one or more embodiments described and illustrated herein.
Figure 14:
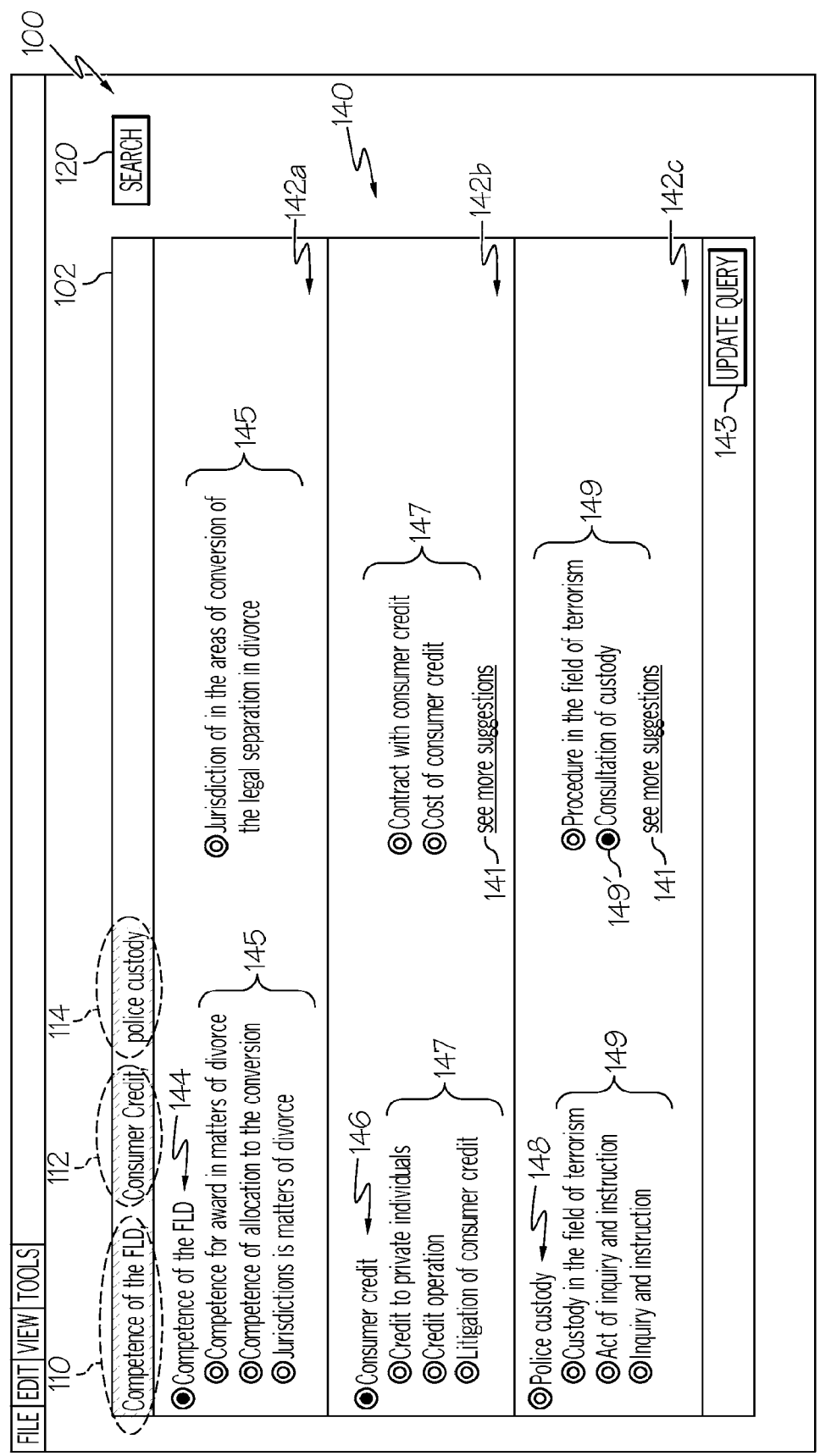

FIG. 13 illustrates one example of a semantic suggestion region 130 generated in response to a request (either by the user or automatically) that is positioned below the text input field 102. A search query comprising a first query segment 110, a second query segment 112, and a third query segment 114 has been entered into the text input field (e.g., as described above). The semantic suggestion region 130 displays several semantic suggestions 132*a*-132*d* that correspond to one or more of the query segments inputted into the text input field 102. It should be understood that embodiments are not limited to the semantic suggestion region 130 illustrated in FIG. 13, and that other configurations are also possible.

In the embodiment illustrated in FIG. 13, a user may expand the semantic suggestion region 130 to see all of the semantic suggestions by clicking one of the semantic suggestions, or by clicking a "More Suggestions" link 131. An expanded semantic suggestion region 140 may be displayed that organizes the semantic suggestions in proximity to the corresponding query segment. For example, the expanded semantic suggestion region 140 has a first sub-region 142*a* that corresponds to the first query segment, a second sub-region 142*b* that corresponds to the second query segment, and a third sub-region 142*c* that corresponds to the third query segment. The number of sub-regions may depend on the number of query segments. The text of the first query segment may be provided in a first query segment radio button 144, and corresponding first semantic suggestions 145 may be provided below in a selectable, radio button form. It should be understood that other arrangements and formats may also be utilized. Similarly, the second semantic suggestions 147 may be displayed under a second query segment radio button 146, and third semantic suggestions 149 may be displayed under a third query segment radio button 148. A "See more suggestions" link 141 may be provided when there are more semantic suggestions than can be displayed. Clicking or otherwise selecting the "See more suggestions" link 141 may display additional semantic suggestions.

A user may select the query segments and/or semantic suggestions to include in the search query by clicking the appropriate radio-buttons. Other means of providing selectable entities such as query segments and semantic suggestions may also be utilized. In the example illustrated in FIG. 14, the user has decided to keep the original first query segment and the second query segment by selecting the first query segment radio button 144 and the second query segment radio button 146, respectively. However, the user has decided to change the search query by selecting third query segment radio button 149'. As described below, the user may replace the phrase "police custody" with "office plurality of police custody" as the third query segment (e.g., by clicking or otherwise selecting the "Update Query" button 143).

Referring once again to the flowchart of FIG. 12, it may be determined if a selected query suggestion has been received at block 164 (e.g., by a use selecting a semantic suggestion radio button and clicking the "Update Query" button 143, or by other means). If no, the process ends at block 165. If yes, the text of the previous query segment is replaced with the text of the selected semantic suggestion in the search query at block 166.

In one embodiment, the user may retrieve new semantic suggestions that are based on a revised search query. For example, after replacing a query segment with a semantic suggestion, the user may request updated semantic suggestions at block 167. If an update semantic suggestion request is not received, then the process may end at block 165 and the user may decide to run the current or revised search query to retrieve a set of documents. If an update semantic suggestion request is received at block 167, then the process may continue to block 161 such that new semantic suggestions are generated based on the query segments of the revised search query.

It should be understood that embodiments described herein provide for multiple auto-complete sessions within a single text input field, wherein query suggestions are provided for individual query segments of a search query. Such a text input field may be familiar to users and therefore easy to use and understand. The multiple auto-complete sessions may enable the search query to be more effective in retrieving relevant documents because the query suggestions may be normalized to reflect the spelling of terms and phrases in the corpus being searched. Further, semantic suggestions may also be displayed to a user based on the distinct query segments of the search query. The semantic suggestions may be based on the query segments individually, a group of query segments, or all of the query segments.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A method in a computer system for generating a legal search query, the method comprising:
   receiving a first string of characters inputted into a text input field of a graphical user interface, the first string of characters representing a first portion of the legal search query;
   conducting a first auto-complete session comprising:
     obtaining one or more first query suggestions from a server computing device;
     displaying the one or more first query suggestions within the graphical user interface, the one or more first query suggestions based at least in part on the first string of characters;
     receiving a selected first query suggestion; and
     displaying the selected first query suggestion in a first query segment within the text input field;
   receiving a second string of characters inputted into the text input field of the graphical user interface, the second string of characters representing a second portion of the legal search query that is distinct and independent from the first query segment within the text input field;
   conducting a second auto-complete session that is distinct from the first auto-complete session, the second auto-complete session comprising:
     obtaining one or more second query suggestions from the server computing device;
     displaying the one or more second query suggestions within the graphical user interface, the one or more second query suggestions based at least in part on the second string of characters;
     receiving a selected second query suggestion; and
     displaying the selected second query suggestion in a second query segment that is distinct from the first query segment within the text input field,
   detecting a position of a text cursor within the first query segment or the second query segment;
   displaying one or more additional first query suggestions based at least in part on the position of the text cursor within the first query segment, and displaying one or more additional second query suggestions based at least in part on the position of the text cursor within the second query segment;
   receiving an operator in the text input field of the graphical user interface, wherein the operator is added to the first query segment or the second query segment;
   splitting the first query segment or the second query segment into two or more split query segments based on a location of the operator within the text input field, wherein the splitting results in an additional autocomplete session for each of the two or more split query segments;
   obtaining one or more semantic suggestions from a semantic suggestion server that is separate from the server computing device, wherein the one or more semantic suggestions are semantically similar to the first query segment, the second query segment, or the two or more split query segments;
   displaying the one or more semantic suggestions for at least one of the first query segment, the second query segment, and the two or more split query segments, wherein the legal search query comprises the first query segment and the second query segment; and
   searching a legal document database using the legal search query to return and display a set of retrieved legal documents.

2. The method of claim 1, wherein the second query segment is positioned adjacent to the first query segment in the text input field.

3. The method of claim 1, wherein the first query segment and the second query segment comprise a background color that is different from the background color of the text input field and is user selectable.

4. The method of claim 1, further comprising:
   receiving an additional string of characters representing an additional portion of the legal search query;
   obtaining one or more additional query suggestions from the server computing device;
   displaying the one or more additional query suggestions based at least in part on the additional string of characters; and
   receiving a selected additional query suggestion from the one or more additional query suggestions, and displaying the selected additional query suggestion in an additional query segment within the text input field.

5. The method of claim 1, wherein:
   the one or more first query suggestions are displayed dynamically as the first string of characters are received; and
   the one or more second query suggestions are displayed dynamically as the second string of characters are received.

6. The method of claim 1, further comprising:
   after displaying the selected first query suggestion and before receiving the second string of characters, placing the text cursor within the text input field positioned after the first query segment.

7. The method of claim 1, wherein:
   displaying the one or more first query suggestions comprises displaying one or more first query suggestions that exactly match first phrases or first words that appear within documents of a document corpus; and
   displaying the one or more second query suggestions comprises displaying one or more second query suggestions that exactly match second phrases or second words that appear within the documents of the document corpus.

8. A method in a computer system for generating a legal search query, the method comprising:
   receiving the legal search query from a single text input field, the legal search query comprising a first query segment and a second query segment, wherein:
      the first query segment is distinct and independent from the second query segment in the single text input field, and
      the first query segment and the second query segment are distinct phrases of the legal search query resulting from individual auto-complete sessions;
   detecting a position of a text cursor within the first query segment or the second query segment;
   displaying one or more additional first query suggestions based at least in part on the position of the text cursor within the first query segment, and displaying one or more additional second query suggestions based at least in part on the position of the text cursor within the second query segment;
   receiving an operator in the single text input field, wherein the operator is added to the first query segment or the second query segment;
   splitting the first query segment or the second query segment into two or more split query segments based on a location of the operator within the single text input field, wherein the splitting results in an additional autocomplete session for each of the two or more split query segments;
   obtaining one or more query suggestions from a server computing device, the one or more query suggestions based at least in part on the first query segment, the second query segment, or the two or more split query segments;
   obtaining one or more first semantic suggestions based at least in part on the first query segment from a semantic suggestion server that is separate from the server computing device, wherein the one or more first semantic suggestions are semantically similar to the first query segment;
   obtaining one or more second semantic suggestions based at least in part on the second query segment from the semantic suggestion server, wherein the one or more second semantic suggestions are semantically similar to the second query segment and distinct from the one or more first semantic suggestions;
   obtaining one or more third semantic suggestions based at least in part on the two or more split query segments from the semantic suggestion server, wherein the one or more third semantic suggestions are semantically similar to the two or more split query segments and distinct from the one or more first semantic suggestions and the one or more second semantic suggestions;
   displaying the one or more query suggestions with the one or more first semantic suggestions, the one or more second semantic suggestions, and the one or more third semantic suggestions within a graphical user interface;
   generating the legal search query from one or more selections from a user via the graphical user interface; and
   searching a legal document database using the legal search query to return and display a set of retrieved legal documents.

9. The method of claim 8, wherein the first query segment and the second query segment originate from a text input field of the graphical user interface.

10. The method of claim 8, wherein:
the legal search query comprises an additional query segment that is distinct from the first query segment and the second query segment; and
the method further comprises:
   obtaining one or more additional semantic suggestions based at least in part on the additional query segment from the semantic suggestion server, wherein the one or more additional semantic suggestions are semantically similar to the additional query segment; and
   displaying the one or more additional semantic suggestions within the graphical user interface.

11. The method of claim 8, wherein:
the one or more first semantic suggestions are based at least in part on a combination of the first query segment and the second query segment; and
the one or more second semantic suggestions are based at least in part on the combination of the first query segment and the second query segment.

12. The method of claim 11, wherein:
a change to the first query segment changes the one or more first semantic suggestions and the one or more second semantic suggestions; and
a change to the second query segment changes the one or more second semantic suggestions and the one or more first semantic suggestions.

13. The method of claim 8, wherein the graphical user interface comprises a suggestion region that displays at least some of the one or more first semantic suggestions and the one or more second semantic suggestions.

14. The method of claim 8, wherein the one or more first semantic suggestions are displayed in proximity to the first query segment and the one or more second semantic suggestions are displayed in proximity to the second query segment.

15. The method of claim 8, further comprising:
replacing the first query segment with a selected first semantic suggestion in the legal search query upon a selection of the selected first semantic suggestion; and
replacing the second query segment with a selected second semantic suggestion in the search query upon a selection of the selected second semantic suggestion.

16. A method in a computer system for generating a search query, the method comprising:
   receiving a first string of characters inputted into a text input field of a graphical user interface, the first string of characters representing a first portion of the search query;
   conducting a first auto-complete session comprising:
      obtaining one or more first query suggestions from a server computing device;
      displaying the one or more first query suggestions within the graphical user interface, the one or more first query suggestions based at least in part on the first string of characters;
      when one of the one or more first query suggestions is not selected, selecting the first string of characters as a first query segment; and
      displaying the first query segment within the text input field;
   receiving a second string of characters inputted into the text input field of the graphical user interface, the second string of characters representing a second portion of the search query that is distinct and independent from the first query segment within the text input field;
   conducting a second auto-complete session that is distinct from the first auto-complete session, the second auto-complete session comprising:

obtaining one or more second query suggestions from the server computing device;

displaying the one or more second query suggestions within the graphical user interface, the one or more second query suggestions based at least in part on the second string of characters;

receiving a selected second query suggestion; and displaying the selected second query suggestion in a second query segment that is distinct from the first query segment within the text input field, detecting a position of a text cursor within the first query segment or the second query segment;

displaying one or more additional first query suggestions based at least in part on the position of the text cursor within the first query segment, and displaying one or more additional second query suggestions based at least in part on the position of the text cursor within the second query segment;

receiving an operator in the text input field, wherein the operator is added to the first query segment or the second query segment;

splitting the first query segment or the second query segment into two or more split query segments based on a location of the operator within the text input field, wherein the splitting results in an additional autocomplete session for each of the two or more split query segments;

obtaining one or more semantic suggestions from a semantic suggestion server that is separate from the server computing device, wherein the one or more semantic suggestions are semantically similar to the first query segment, the second query segment, or the two or more split query segments;

displaying the one or more semantic suggestions for at least one of the first query segment, the second query segment, and the two or more split query segments, wherein the search query comprises the first query segment, the second query segment, and the two or more split query segments; and searching a legal document database using the search query to return and display a set of retrieved legal documents.

* * * * *